United States Patent [19]

Beccalori et al.

[11] 4,360,167
[45] Nov. 23, 1982

[54] APPARATUS FOR THE REDUCTION OF BIG CYLINDRICAL BALES OF HAY, STRAW AND THE LIKE AND FOR THE DISTRIBUTION THEREOF

[76] Inventors: Ferruccio Beccalori; Gianguido Corvi; Giovanni Merli; Giancarlo Tamburoni; Lorenzo Tamburoni, all of via Zena 15, Carpaneto (Piacenza), Italy

[21] Appl. No.: 192,006

[22] Filed: Sep. 29, 1980

[30] Foreign Application Priority Data

Nov. 13, 1979 [IT] Italy ............................. 27260 A/79

[51] Int. Cl.³ ...................... A01D 87/12; A01D 90/10
[52] U.S. Cl. ............................. 241/101 A; 83/411 R; 241/101.7; 241/283; 242/86.5 R; 414/24.6; 414/551; 414/552
[58] Field of Search ...................... 414/24.5, 24.6, 55, 414/552, 555, 434, 435, 436, 911; 83/411 R, 701, 870; 241/101 A, 101.7, 283; 242/86.5 R, 86.52

[56] References Cited

U.S. PATENT DOCUMENTS

| 3,277,846 | 10/1966 | Kesselman | 83/870 X |
| 3,452,888 | 7/1969 | Larson et al. | |
| 3,822,617 | 7/1974 | Weichel | 83/701 X |
| 3,874,609 | 4/1975 | Larson | 414/24.5 |
| 3,968,940 | 7/1976 | Godbersen | 414/24.6 |
| 4,195,958 | 4/1980 | Vahlkamp et al. | 414/24.6 |
| 4,266,899 | 5/1981 | Skeem | 414/24.6 |

FOREIGN PATENT DOCUMENTS

| 1065808 | 11/1979 | Canada | 414/24.5 |
| 2810676 | 9/1979 | Fed. Rep. of Germany | 241/101.7 |
| 2371868 | 7/1978 | France | 414/24.6 |
| 2048211 | 12/1980 | United Kingdom | 414/24.6 |

Primary Examiner—Leslie J. Paperner
Attorney, Agent, or Firm—McGlew and Tuttle

[57] ABSTRACT

An apparatus for the unrolling or reduction of cylindrical bales of hay, straw or like material and for the measured distribution of such materials directly to the place of use, comprising, a trolley or trailer capable of being attached to the rear of a tractor and; a substantially horizontal journal or pivot member extending parallel to the forward direction of movement of the trailer and capable of being axially inserted into a cylindrical bale. A mechanism is provided for displacing the pivot member parallel to itself from a lateral, pick-up position to an upper loaded position. The apparatus includes a substantially horizontal conveyor disposed transversely for supporting and unwinding or rotating the cylindrical bale which is loaded thereon and retained by the pivot member. A rotary distributor member provided with projecting teeth or the like is, located near the unloading end of the conveyor, for distributing and laterally directing the material coming from the cylindrical bale which is removed by the conveyor. A driving unit for the actuation of the conveyor and of the distributor member is also provided.

9 Claims, 7 Drawing Figures

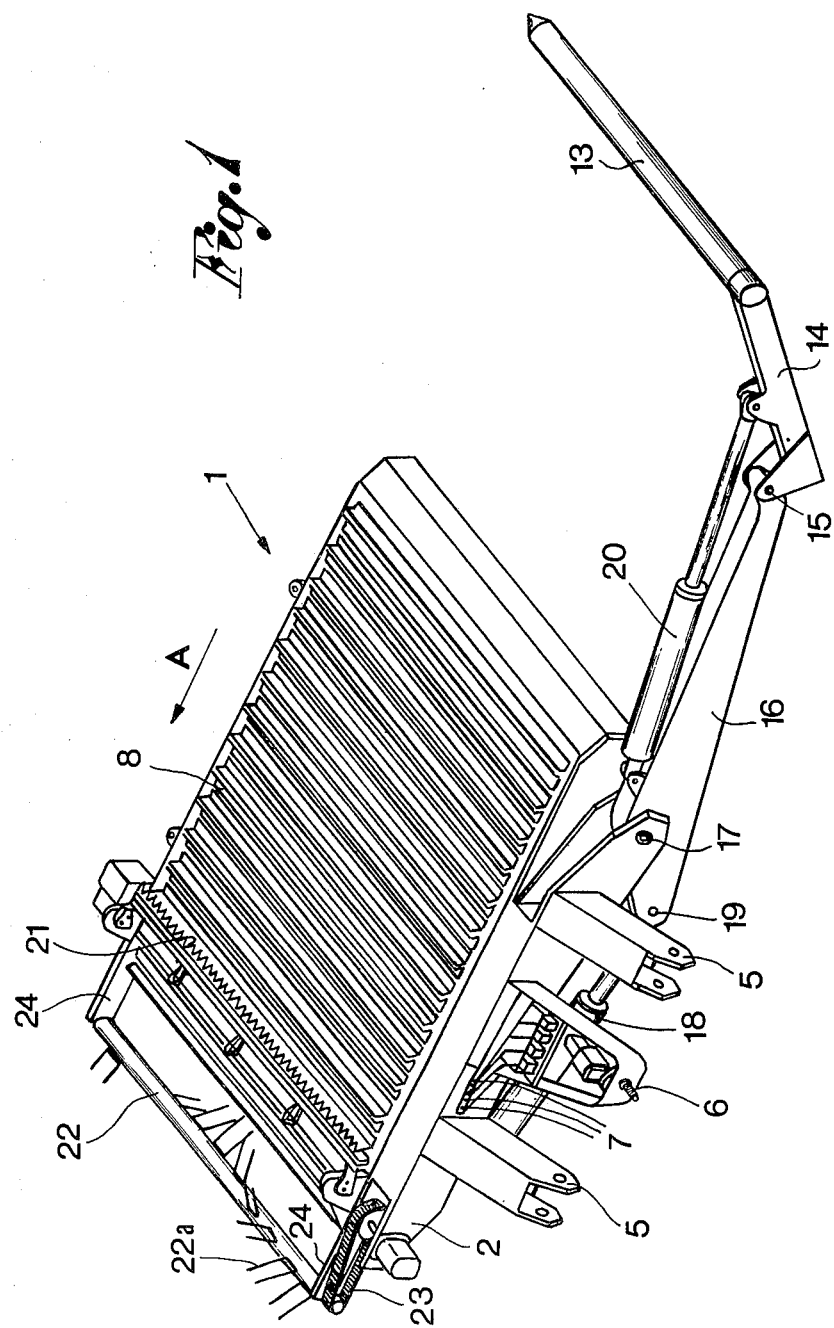

APPARATUS FOR THE REDUCTION OF BIG CYLINDRICAL BALES OF HAY, STRAW AND THE LIKE AND FOR THE DISTRIBUTION THEREOF

FIELD AND BACKGROUND OF THE INVENTION

As is well known, a relatively new technique for the packaging of hay and straw has recently become increasingly adopted on a wide scale in agriculture. This technique involves the use of suitable rotary presses for forming, on the spot, big cylindrical bales in dimensions usually of 120–150 cm in depth and 150–180 cm in diameter and weighing 600–800 kg.

The use of such a system is advantageous both from the point of view of the quality of the harvested product, which is not damaged as in the case of presses having a horizontal piston for the formation of parallelopiped bales and, above all, from the operative point of view, since only one operator is required to package, load on the spot, transport and stack the resultant bales in the area of stowage.

However, serious difficulties have occurred in the utilisation of the product baled in this manner, in view of the fact that the dimensions and the weights of the cylindrical bales certainly do not permit smooth manual intervention for the distribution and proportioning of the hay and straw in the places of use.

The technique employed currently offers devices which only partially fulfill the above-mentioned requirements. In the majority of cases, in fact, the cylindrical bale is unwound manually by simply rolling it on the ground, the stacked layers being distributed manually with the use of hay-forks.

In some cases the cylindrical bale is cut into strips by means of a power saw provided with a special blade. This involves the disadvantage, however, of very hard work in the cutting operation itself, whilst the following operation of distribution must always be carried out manually.

Mechanical devices are also in use which are to be attached to the rear of a tractor, the devices being operable to engage the cylindrical bale in the centers of its two base surfaces and, to drag it, and unwind it on the ground. With such a system, however, the quantity of hay or straw which is unwound is uncertain, and manual intervention by the operator is always necessary in order to distribute and apportion the amount harvested.

SUMMARY OF THE INVENTION

The principal object of the present invention is to eliminate or minimize the above-mentioned disadvantages associated with known systems, by the provision of an apparatus which, without requiring any manual intervention, makes it possible to transport the big cylindrical bales to the place of use and there effecting the measured distribution of the harvested product and the depositing thereof exactly where required.

Another important object of the present invention is to provide an apparatus which is simple and reliable to operate and the dimensions of which are sufficiently small to permit convenient transport and use in most cases even in very small stables or sheds.

According to the present invention there is provided apparatus for the unrolling or reduction of cylindrical bales of hay, straw or like material and for the measured distribution of such materials directly to the place of use, comprising a trolley or trailer capable of being attached to the rear of a tractor; a substantially horizontal journal or pivot member extending parallel to the forward direction of movement of the trailer and capable of being axially inserted into a cylindrical bale, means for displacing said pivot member parallel to itself from a lateral, pick-up position to an upper loaded position, and conversely; a substantially horizontal conveyor means disposed transversely for supporting and unwinding or rotating said cylindrical bale loaded thereon and retained by means of said pivot member; a rotary distributor member provided with projecting teeth or like members, located near the unloading end of said conveyor, for distributing and laterally directing the material coming from said cylindrical bale removed by the conveyor means; and driving means for the actuation of said conveyor and of said distributor member.

According to a further feature of the present invention, in order to obtain accurate adjustment on the quantity of hay or straw moved during distribution, a device of suitable shape is provided parallel to the axis of said journal or pivot member and mounted above said conveyor, upstream of said distributor member, to cut a length of hay or straw of substantially constant depth from said cylindrical bale as it is unwound on the conveyor.

Further features and advantages of the invention will be apparent from the detailed description of a preferred, but not exclusive, embodiment of an apparatus for the unrolling or reduction of cylindrical bales of hay, straw and the like, and for the measured distribution thereof directly at the place of use, illustrated by way of example only, with reference to the attached drawings;

BRIEF DESCRIPTION OF THE DRAWINGS

In the Drawings:

FIG. 1 is a perspective view of the apparatus according to the invention;

DESCRIPTION OF THE PREFERRED EMBODIMENT

Figure 3:
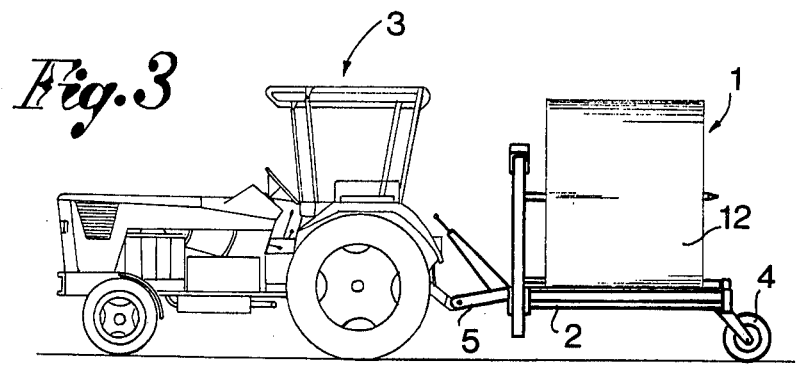
FIG. 3 is a side elevation of the apparatus of the invention after the loading of a cylindrical bale and shown attached to a tractor.

With reference to the drawings, the apparatus according to the invention, indicated as a whole by the numeral 1, comprises a carriage or trailer 2 capable of being attached to a tractor 3. The above-mentioned trailer, more specifically, comprises a frame or chassis provided at the rear with two articulated wheels 4 and at the front with attachments 5 intended for connection to a three-point hydraulic linkage normally present in tractors for agricultural use. FIG. 1 clearly shows two of the above-mentioned attachments 5, whilst a third attachment (not shown) of telescopic type is provided for preventing any sticking or stopping of the trailer when set in reverse drive. The attachment of the apparatus to the hydraulic lift of a tractor permits not only normal operation, but also inclining of the apparatus in the loading phase.

A hydraulic system is provided for the actuation of the apparatus and will be described hereinafter. The system is powered by means of a front shaft 6 (FIGS. 1,5,6) which is connectable to the power source or power-take-off of the tractor.

Located above the shaft 6 are control levers 7 for controlling operation of the apparatus.

Figure 2:
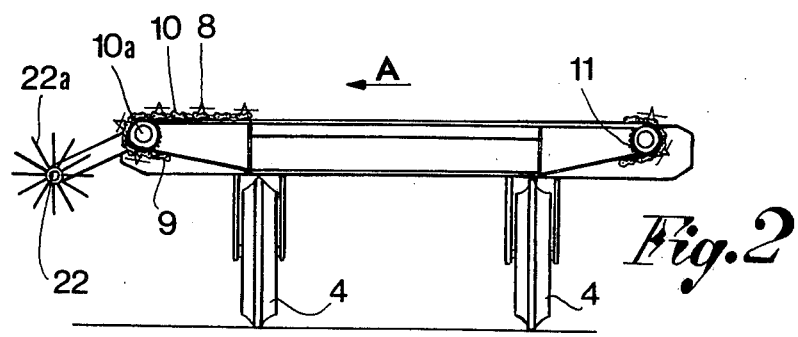
FIG. 2 is a cross-section of the apparatus of FIG. 1.

An endless conveyor 8 is mounted on the chassis of the trailer 2 in substantially horizontal position and is formed by a plurality of parallelly arranged adjacent section bars, secured on a pair of endless chains 9 (shown in part and schematically in FIG. 2) suitably spaced apart and running over respective toothed wheels 10 and 11. The conveyor 8 is disposed to extend at right angles to the normal forward direction of movement of the trailer 2 and occupies substantially the whole length of the trailer so as to form a supporting surface for cylindrical bales 12 of hay, straw or like material, which is here collectively termed hay-like material. When the conveyor is advanced in the direction of the arrow A (FIGS. 1 and 2), a cylindrical bale 12, deposited on the conveyor, is unrolled, as will be explained hereinafter.

A loader is provided for the loading of the bales 12 onto the conveyor 8 and comprises a spike or pivot member 13 mounted freely with its axis parallel to the bars forming the conveyor 8, or parallel, in the normal position of travel, with the direction of movement of the trailer 2.

Figure 5:
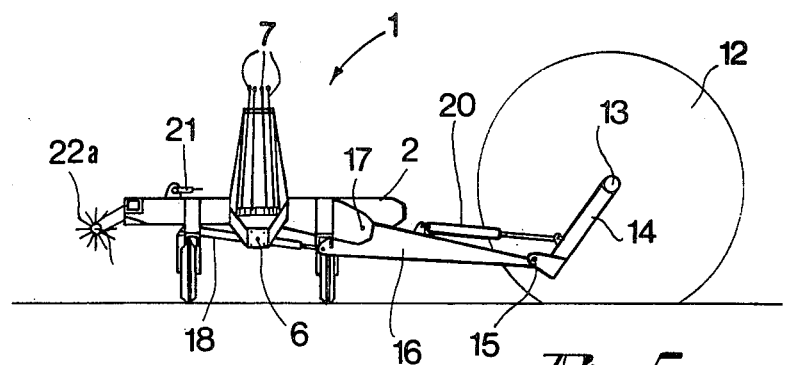
FIG. 5 is a front elevation of the apparatus according to the invention during initial loading of a cylindrical bale.
Figure 6:
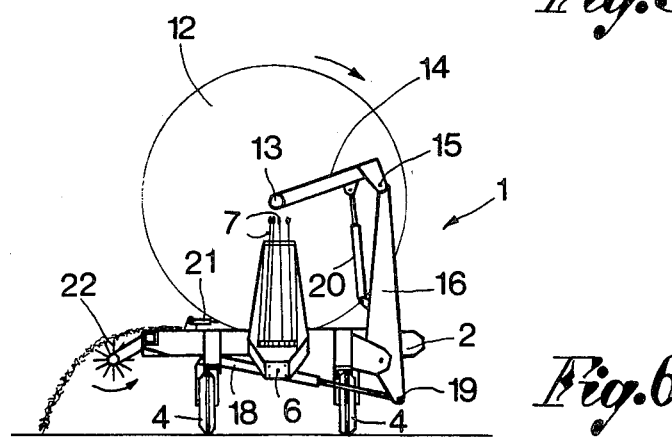
FIG. 6 is a front elevation of the apparatus after the loading of a cylindrical bale.

More precisely, the pivot member 13 is formed by a pointed tubular rod secured to one end of an arm 14 which, in turn, is hinged or pivoted at pivot point 15 on the end of another arm 16. The arm 16 is pivoted at an intermediate point 17 on the frame or chassis of the trailer 2 and is displaceable about the point 17 by means of a double-acting hydraulic cylinder 18 which is connected at one end to the chassis of the trailer and is connected at the other end to an extreme point 19 of the arm 16 (FIGS. 1,5,6).

Another double-acting hydraulic cylinder 20 is connected at one end, to the arm 16 and, at the other end, to the arm 14 so that it can displace the arm 14 relative to the arm 16 by rotation about the pivot point 15.

Figure 4:
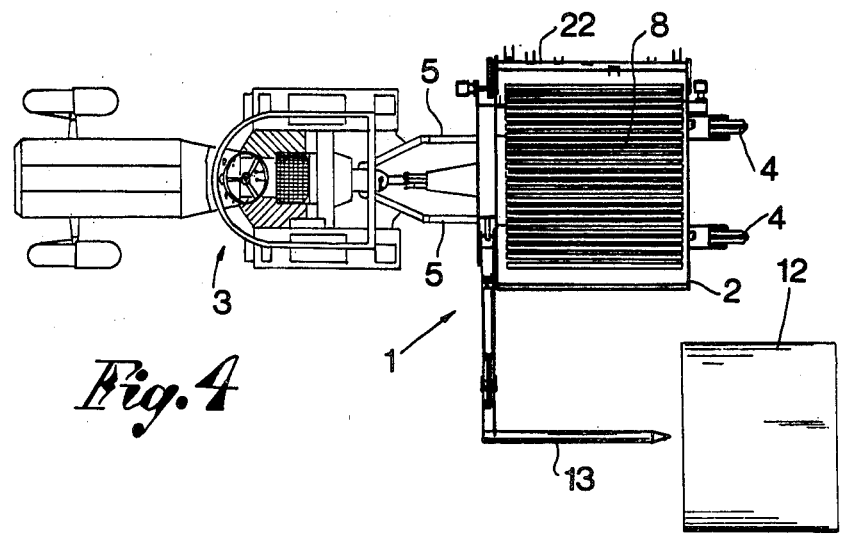
FIG. 4 is a plan view of the apparatus attached to a tractor in its condition immediately preceding the loading of a cylindrical bale.

By suitable operation of the hydraulic cylinders 18 and 20, the pivot member 13 may be displaced in parallel with itself from an unloaded side position (FIGS. 1,4,5) to a raised load position (FIG. 6) and conversely.

More precisely, for the loading of a cylindrical bale 12 lying on the ground, the pivot member 13 is positioned at the level of the axis of the bale and the movement of the trailer 2 is then reversed in a direction parallel to the axis of bale to be taken-up until said bale is threaded along the axis of the pivot member 13 (FIGS. 4 and 5)—exploiting the fact that the compactness of the hay or straw in the central area is greatly reduced relative to that of the remaining parts.

When the pivot member 13 has completely penetrated the cylindrical bale 12, the hydraulic cylinders 18 and 20 are actuated and the bale 12 is raised and loaded onto the conveyor 8 which will effect the unwinding thereof—as will be seen hereinafter.

In order to obtain regular unrolling with the formation of a layer of material of constant thickness, a cutting unit 21 is also provided, and mounted above the conveyor 8, at a short space therefrom and arranged horizontally in parallel with the bars forming the conveyor.

This conventional cutting unit 21 is formed by a pair of toothed blades which are axially displaceable to each other. The unit is mounted with the possibility of vertical displacement and with adjustment of the inclination of the blades, so as to obtain suitable control of the thickness of the layer which is being gradually cut. The cutting unit 21 is located near the unloading end of the conveyor 8.

The apparatus also comprises a distributor member formed by a rotating shaft 22 mounted with its axis parallel to the bars forming the conveyor 8 (or parallel to the axis of the pivot member 13) and provided with a plurality of flexible projecting teeth disposed in a spiral along the entire length of the shaft.

This shaft 22 is mounted downstream of the cutting unit 21 and is rotated by means of a belt transmission 23 (FIG. 1) which in turn receives its drive from the conveyor 8 and more precisely from the shaft 10a (FIG. 7) which carries the toothed wheel 10 over which pass the chains of the conveyor.

It is proposed that the peripheral velocity of the teeth 22a should be greater than that of the conveyor 8 so that there is obtained, in co-operation with the teeth, an unfolding action of the layer of material which is gradually unwound from the cylindrical bale disposed on the conveyor thus obtaining a regular distribution of the mown crop.

In addition, the shaft 22 is supported at its ends by two arms 24 which are loosely secured to the chassis of the trailer 2 with the possibility of angular displacement, so that, as desired, the level of the shaft from the ground may be adjusted in order to compel the mown crop to follow an adjustable path so that said crop may be deposited at a greater or lesser distance from the apparatus.

Figure 7:
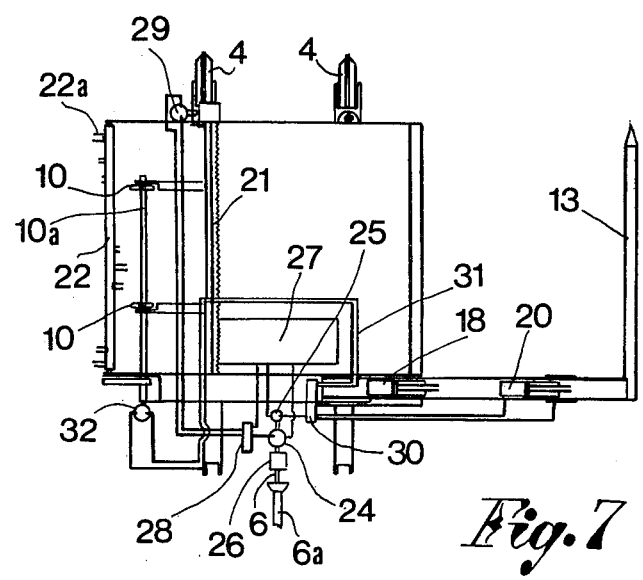
FIG. 7 is a plan view showing the hydraulic system of the operating members of the apparatus.

The hydraulic system for the operation of various members of the apparatus is illustrated in FIG. 7.

It is proposed that the shaft 6, connected to the power source of the tractor by means of a carden joint 6a should simultaneously operate two pumps 24 and 25 by means of a revolution multiplier 26.

The pump 24 takes up hydraulic oil from the tank 27 and feeds it to distributor 28 which serves hydraulic drive or motor 29 for actuating the cutting unit 21. The operating fluid then returns from the motor 29 to the tank 27 by way of the distributor 28.

The other pump 25 also takes oil from the tank 27 to feed it to the distributor 30 which feeds the hydraulic cylinders 18 and 20 and, by way of the conduits 31, feeds a hydraulic motor 32 which rotates the shaft 10a. The shaft 10a drives the conveyor 8 and, by means of the transmission 23, the shaft 22 of the distributor device.

The operation of the above-described apparatus is as follows:

After the apparatus has been reversed so as to insert the pivot member 13 in the axial region of the cylindrical bale 12 (FIGS. 4 and 5), the bale is engaged and raised by the action of the hydraulic cylinders 18 and 20 until it is deposited on the conveyor 8 (FIGS. 3 and 6). Then, whilst the apparatus is being drawn forwardly by the tractor 3, the continuous movement of the conveyor 8 produces rotation of the cylindrical bale 12 about the pivot 13 on which it is threaded and consequently the unrolling of the bale begins. In this phase the hydraulic cylinder 20 is set to discharge so that the bale 12 still resting on the conveyor can be lowered at the same rate as it unwinds by the effect of its own weight whilst the pivot member 13 is free to follow a trajectory over an arc of a circle with its center on the axis of the pivot point 15, progressively approaching the conveyor. If the adhesion between the bale 12 and the conveyor 8, determined by its own weight, should not be sufficient to ensure rotation of the bale itself, it is possible to activate the hydraulic cylinder 20 in a direction to push the arm 14 downwardly, thus pressing the pivot member 13 toward the conveyor. The pivot member 13 may also be displaced by causing the hydraulic cylinder 18 to intervene so as to suitably position it on the conveyor 8.

The rotation continues until the cylindrical bale is completely unwound and the single layer of material of adjustable thickness which is detached from the rotating mass is transported by the conveyor and the rotating distributor 22, 22a to be unloaded laterally of the apparatus towards the area of use.

If it is desired to obtain greater uniformity in the distribution of the material, the cutting unit 21 is also set in operation which effects a cut substantially along a generatrix of the cylindrical bale whilst said bale rotates about the pivot member 13. At the same time the hydraulic cylinder 18 is set to discharge so that the bale 12 may be displaced towards the cutting blades, adapting itself thereto and thus presenting always fresh material to be cut.

The cutting thickness (determined by the space between the blades and the conveyor below them) therefore remains constant for any specific adjustment. Naturally, this thickness may be varied as desired by raising or lowering the cutting member relative to the conveyor, whilst the cutting angle may be adjusted by inclining the blades more or less relative to the conveyor.

Hence, after the adjustment and whilst keeping the speed of rotation of the various members constant, the quantity of mown material passing below the cutting blades remains fixed and, consequently, also the amount of material which is unloaded on the ground by means of the distributor 22, 22a also remains constant.

Naturally, by increasing the cutting thickness (i.e. by raising the unit 21 relative to the conveyor 8) the quantity of cut is increased with each rotation of the cylindrical bale, so that it is possible to obtain an exact proportion of mowings in the area of use, according to requirements.

The action of the distributor 22, 22a thus achieves uniform distribution of the material so as to avoid the formation of empty regions, whilst the material itself is suitably directed to the area where it is to be used (if the shaft 22 is raised, the material will follow along a path so that said material is thrown a greater distance from the apparatus).

It is thus possible to have uniform and exactly proportioned distribution with material deposited directly in the area of use, for example, in the mangers of stables.

In view of the fact that the movement of the conveyor and cutting unit is obtained by way of hydraulic motors 32 and 29, due to the rotation of the shaft 6 which actuate the pumps 24 and 25 with said shaft being connected to the power source of the tractor, the speed of the members will be commensurate with the forward speed of the apparatus over the ground, whereby regular distribution is always obtained at any forward speed.

The use of hydraulic motors also renders possible smooth reversal of the operating movements so that, for example, the conveyor may be displaced in a direction opposite to that indicated by the arrow A in FIG. 1 in order to effect discharge in a position opposed to that described above. This reversal also makes it readily possible to eliminate any build-up of material on the cutting blades.

Naturally, the apparatus may be completed by side edges (not shown) for containing and guiding the material displaced by the conveyor.

The present invention is capable of numerous modifications and variants whilst remaining within the scope of the inventive concept.

Thus, for example, the system for picking-up and raising cylindrical bales may be obtained differently from the one described above, by providing two opposed pivots in place of a single pivot member 13 and bringing them together and separating them in a pincer-like formation, so that they can be inserted at both ends of the bales and along the axis thereof.

We claim:

1. An apparatus for the discharge of hay-like material from a cylindrical bale thereof, which apparatus is adapted to be pulled by a tractor having a three point hydraulic lifting linkage, comprising:
   a trailer having a chassis and a pair of articulating wheels connected to the chassis adjacent a rear end thereof for movement of the trailer;
   connection means connected to the chassis adjacent a front end thereof for connecting said trailer to the three point hydraulic lifting linkage of the tractor so that the tractor can move the trailer in a travel direction;
   a conveyor connected to said chassis for movement in a horizontal and transverse direction to the travel direction over the top of said chassis, said conveyor having a discharge side adjacent the lateral side of said chassis for conveying hay-like material across said chassis;
   cutting means connected to said chassis above said conveyor and adjacent said conveyor discharge side, said cutting means extending in the travel direction for cutting the hay-like material in the travel direction to a substantially constant depth;
   a rotary distributor member having a plurality of projecting teeth, rotatably mounted to said chassis adjacent said conveyor discharge side and laterally outwardly of said cutting means for distributing hay-like material from said trailer lateral side as the hay-like material comes from said conveyor;
   a first arm pivotally mounted to said chassis about an axis extending substantially in the travel direction;
   a second arm pivotally mounted to said first arm adjacent one end of said second arm and about a pivot axis extending substantially in the travel direction;
   a pivot member extending in the travel direction connected to an opposite end of said second arm;
   said first and second arms pivotable to move said pivot member laterally of said trailer for engaging a cylindrical bale adjacent the central axis thereof, said first and second arms pivotable to bring said pivot member into a position above said conveyor for positioning a cylindrical bale on said conveyor;
   a first double acting hydraulic cylinder connected between said first arm and said chassis and a second double acting hydraulic cylinder connected between said first arm and said second arm, said first and second hydraulic cylinders operable to move said first and second arms and said pivot member; and drive means connected to said first and second hydraulic cylinders, said conveyor, said distributor means and said cutting means for activation thereof.

2. An apparatus according to claim 1, wherein said cutting means is adjustably mounted to said chassis for adjusting a height of said cutting means above said conveyor to adjust the thickness of hay-like material which is cut by said cutting means.

3. An apparatus according to claim 1, wherein said cutting means includes cutting blades extending transversely to said travel direction, said cutting means mounted to said chassis for adjustment of an inclination of said blades to said conveyor for adjusting and inclination of a cut in hay-like material effected by said cutting means.

4. An apparatus according to claim 1, wherein said rotary distributor means comprises a shaft rotatably mounted to said chassis, said shaft having an axis extending parallel to said pivot member and to said travel direction, said plurality of projecting teeth arranged on said shaft along an entire length thereof and distributed to form a spiral on said shaft.

5. An apparatus according to claim 4, wherein said drive means drives said shaft at a rate greater than said conveyor for rotating said shaft and said teeth at an angular rate which is greater than a linear speed of displacement of said conveyor.

6. An apparatus according to claim 5, wherein said rotary distributor member includes a pair of support arms pivotally mounted to said chassis and connected to opposite ends of said shaft so that said shaft can be positioned at a selected height with respect to said conveyor.

7. An apparatus according to claim 1, wherein said drive means comprises at least one hydraulic pump which is adapted to be driven by said tractor, a hydraulic reservoir connected to said at least one pump, said at least one pump connected to said first and second double acting hydraulic cylinders, a hydraulic motor connected to said conveyor, said at least one hydraulic pump connected to said hydraulic motor for activating said conveyor.

8. An apparatus according to claim 7, wherein said drive means includes a second hydraulic motor connected to said cutting means and connected to said at least one hydraulic pump.

9. An apparatus according to claim 8, wherein said conveyor includes at least one drive shaft connected to said first mentioned hydraulic motor, said rotary distributor member comprises a shaft rotatably mounted to said chassis and extending in said travel direction, said drive means including a belt engaging said distributor member shaft with said conveyor shaft for co-rotation thereof.

* * * * *